(12) United States Patent
Smiroldo

(10) Patent No.: US 7,845,093 B2
(45) Date of Patent: Dec. 7, 2010

(54) TAPE MEASURE APPARATUS

(76) Inventor: Michael S. Smiroldo, P.O. Box 402, Cobb Island, MD (US) 20625

( * ) Notice: Subject to any disclaimer, the term of this patent is extended or adjusted under 35 U.S.C. 154(b) by 98 days.

(21) Appl. No.: 12/285,561

(22) Filed: Oct. 8, 2008

(65) Prior Publication Data

US 2009/0090017 A1     Apr. 9, 2009

Related U.S. Application Data

(60) Provisional application No. 60/997,989, filed on Oct. 9, 2007.

(51) Int. Cl.
*G01B 3/10*     (2006.01)
(52) U.S. Cl. .......................... 33/770; 33/668
(58) Field of Classification Search .............. 33/755, 33/758, 759, 760, 761, 768, 769, 770, 668
See application file for complete search history.

(56) References Cited

U.S. PATENT DOCUMENTS

| | | | | |
|---|---|---|---|---|
| 3,577,641 A | * | 5/1971 | Smith | 33/27.02 |
| 4,255,856 A | * | 3/1981 | Mackie | 30/293 |
| 4,976,037 A | | 12/1990 | Hines | |
| 5,197,195 A | * | 3/1993 | Aikens | 30/293 |
| 5,815,940 A | * | 10/1998 | Valentine, Sr. | 33/770 |
| 5,842,284 A | | 12/1998 | Goldman | |
| 6,442,860 B1 | * | 9/2002 | Williams et al. | 33/668 |
| 6,694,622 B2 | * | 2/2004 | Kim | 30/293 |
| 6,763,603 B2 | * | 7/2004 | Carrabino | 33/770 |
| 6,912,799 B1 | * | 7/2005 | Smith | 33/770 |
| 6,996,915 B2 | | 2/2006 | Ricalde | |
| 7,260,898 B2 | * | 8/2007 | Snelson | 33/668 |
| 2003/0126757 A1 | * | 7/2003 | Farney et al. | 33/770 |
| 2008/0098610 A1 | * | 5/2008 | Lipps | 33/770 |
| 2008/0141549 A1 | * | 6/2008 | Brown | 33/755 |
| 2009/0249636 A1 | * | 10/2009 | Reda et al. | 33/760 |

FOREIGN PATENT DOCUMENTS

| | | | | |
|---|---|---|---|---|
| GB | 2203839 A | * | 10/1988 | |
| JP | 08128801 A | * | 5/1996 | |
| JP | 08219702 A | * | 8/1996 | |
| JP | 10176901 A | * | 6/1998 | |

* cited by examiner

*Primary Examiner*—R. A. Smith
(74) *Attorney, Agent, or Firm*—Richard C. Litman

(57) ABSTRACT

The tape measure apparatus has a rule blade that is retractably stored in the tape measure apparatus and protrudes when extended during use. For measurements, the rule blade has graduated indicia markings along the rule blade. An endpiece attached to the rule blade has an aperture for receiving a marking instrument to mark and scribe on a work piece and a blade slot for receiving and supporting a blade. There is also a protective shield guide that protects the fingers from slivers and cuts. It has a pivot attachment between the protective shield and the guide. The pivot moves the protective shield into a stored position generally parallel to the rule blade, and in a working position generally perpendicular the rule blade. The guide is slidable along the rule blade. The entire protective shield guide slidably moves into the housing. Thus, the entire protective shield guide disappears and is protected from any outside force by being inside the housing when not in use.

11 Claims, 3 Drawing Sheets

TAPE MEASURE APPARATUS

CROSS-REFERENCE TO RELATED APPLICATION

This application claims the benefit of U.S. Provisional Patent Application Ser. No. 60/997,989, filed Oct. 9, 2007.

BACKGROUND OF THE INVENTION

1. Field of the Invention

The present invention generally relates to carpentry tools and, more specifically, to a tape measure apparatus for use with a retractable tape measure of the type commonly used by carpenters and others when measuring, scribing, and cutting of work pieces.

2. Description of the Related Art

Flexible tape measures are well known and extremely useful. Most flexible tape measures are retractable and have a spring mechanism inside the tape measure that automatically retracts the tape if it is not locked in an extended position. Oftentimes, particularly for carpenters, it is necessary to use the tape to scribe a straight line parallel to an edge of a board or plank or sheet of wood. In many instances, this is accomplished by the carpenter holding with his hand a pencil or other marking instrument against the side of the tape measure housing, locking the tape measure at a predetermined point and then running the tab at the end of the tape measure along the edge of the work piece to be scribed.

While the foregoing method of scribing lines is satisfactory, it does not always result in a straight line being scribed nor always is it possible to maintain a parallel line since the pencil may move during the act of scribing and in other instances incorrect distances may result because of the pencil being located along the side of the tape measure housing adds anywhere from a quarter of an inch to an inch and a half to the distance read on the tape measure, which difference should be accounted for but often is not.

Another of the problems common in carpentry and other construction trades is that when inscribing, marking and cutting various geometric patterns, including straight lines, in such materials as plywood, sheetrock or gypsum board, formica and similar materials, there are frequently splinters and slicing injuries to the fingers or hand holding the tape housing.

Thus, a tape measure apparatus solving the aforementioned problems is desired.

SUMMARY OF THE INVENTION

The tape measure apparatus includes a tape measure housing with a front wall portion defining a rule blade aperture. A rule blade is retractably stored in the tape measure housing through the rule blade aperture and protrudes through the rule blade aperture when extended during use. For measurements, the rule blade has graduated indicia markings along the rule blade.

There is an end-piece attached to the rule blade. The end-piece has a first tab that is parallel to and attached to the rule blade. The first tab has an aperture for receiving a marking instrument to mark and scribe on a work piece. The end-piece further includes a second tab that is perpendicular to both the rule blade and the first tab. The second tab is securely affixed at one end to the first tab and the second tab has a blade slot for receiving and supporting a blade.

There is also a protective shield guide. The protective shield guide has a protective shield, a guide, and a pivot attached between the protective shield and the guide. The pivot attachment is for pivoting the protective shield into a stored position generally parallel to the graduated markings of the rule blade, and in a working position generally perpendicular the graduated markings of the rule blade. The guide is slidable along the rule blade. The guide also has an indication line. The indication line aligns with the graduate indicia markings on the rule blade.

The protective shield and the guide slidably move in tandem into the housing through the rule blade aperture at the front wall portion. Thus, the protective shield and the guide disappear and are protected from any outside force by being inside the housing when not in use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
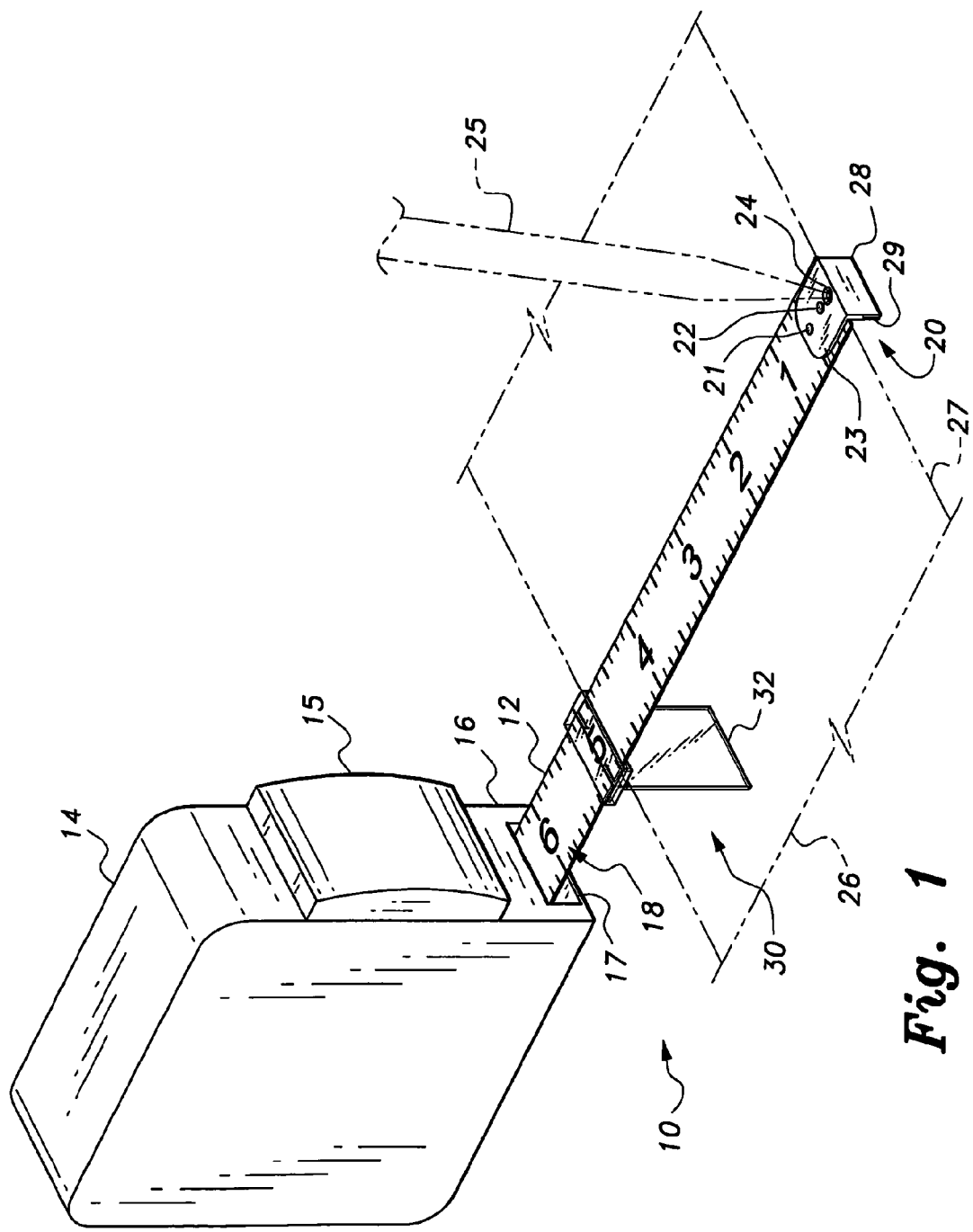
FIG. 1 is an environmental, perspective view of a tape measure apparatus according to the present invention.
Figure 2:
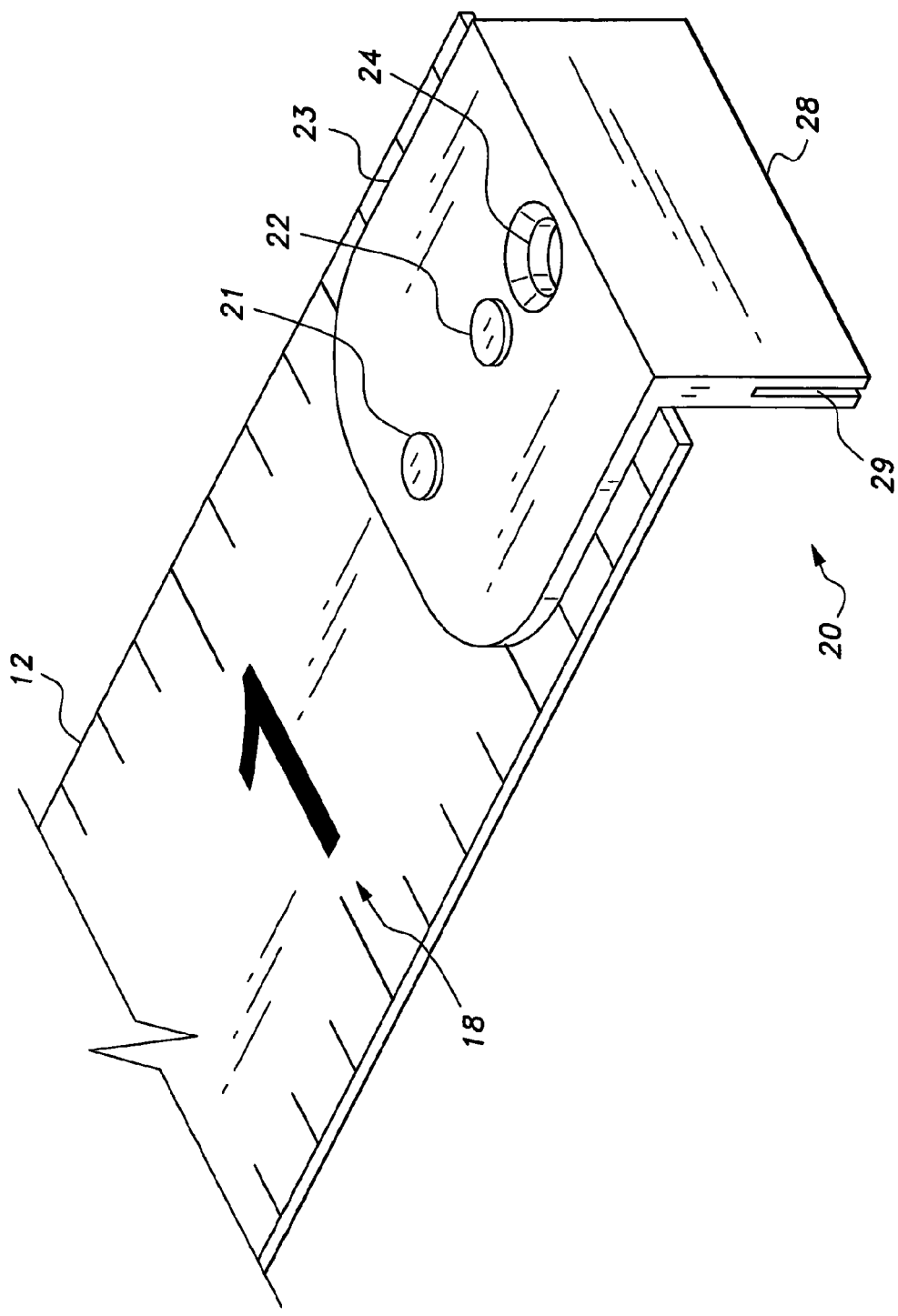
FIG. 2 is a partial perspective view of the tape measure apparatus according to the present invention, showing details of the end-piece.
Figure 3:
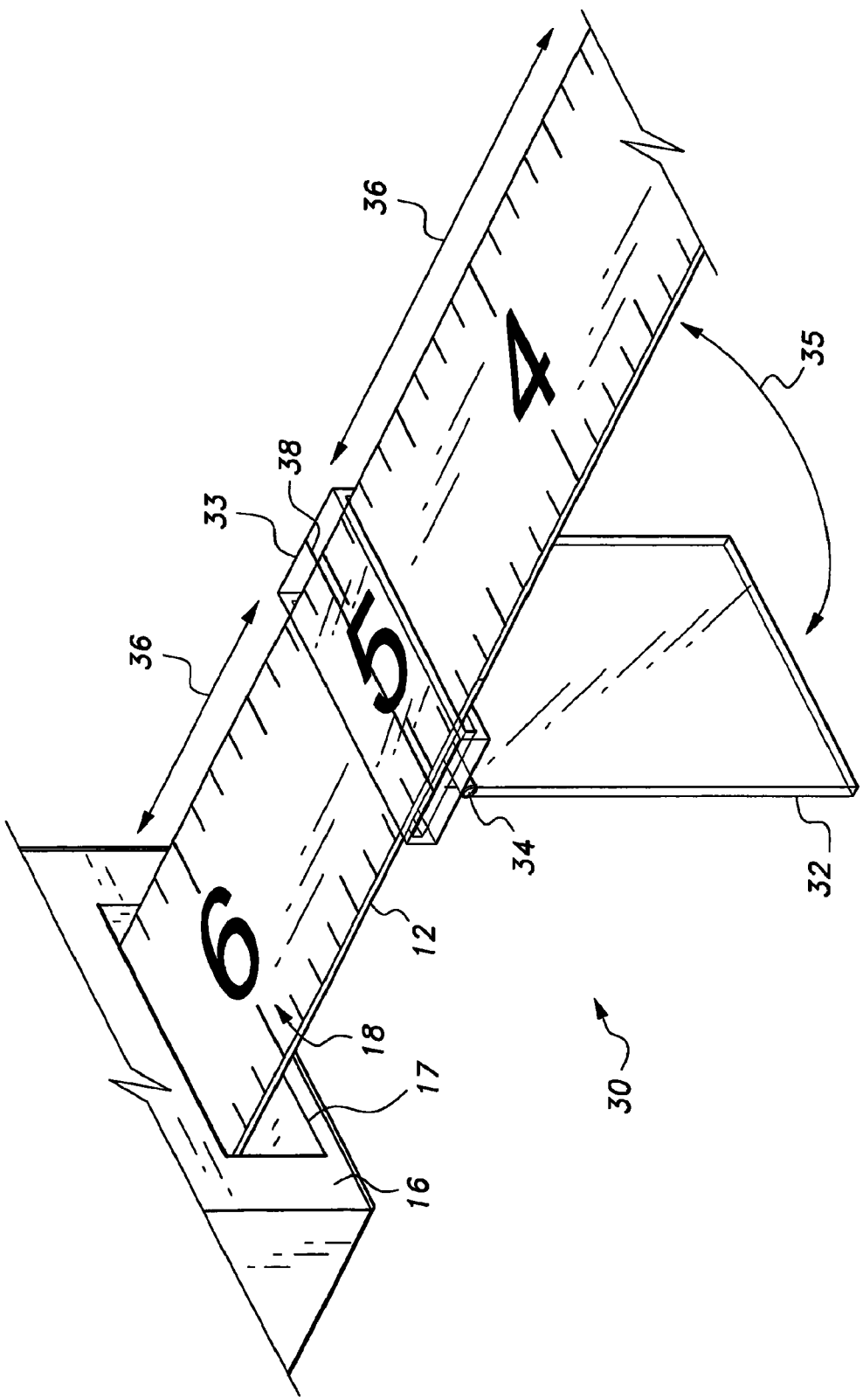
FIG. 3 is a partial perspective view of the tape measure apparatus according to the present invention, showing details of the protective shield guide.

As shown in FIGS. 1 through 3, the tape measure apparatus 10 includes a rule blade 12 that is rolled into a housing 14. A spring mechanism allows retraction of the rule blade 12 upon its release, and a braking mechanism, in the form of a sliding button 15, is pressed against the rule blade 12 to prevent the automatic return working for the purpose of reading the length of the deployed rule blade 12. The housing 14 has a front wall portion 16 under the sliding button 15 that defines a rule blade aperture 17. The rule blade 12 is normally retractably stored in within the housing 14. The rule blade 12 includes graduated indicia markings 18 along the length of the rule blade 12 that function as a calibrated measuring scale. The rule blade 12 is elongated, slightly concave and fabricated out of a substantially strong and durable material, such as spring steel.

As shown in FIG. 2, the rule blade 12 includes an end-piece, generally indicated with the number 20. The end-piece 20 is a two-part metal piece that is securely connected to the rule blade 12 by rivets 21, 22 through a first part or tab 23 that lies parallel to and on top of the rule blade 12. The end-piece tab 23 further includes an aperture 24. The aperture 24 can receive a marking instrument, such as a pencil 25, for marking or scribing a workpiece 26. To hold the end-piece at a starting place 27 for measurement, the end-piece 20 includes a second tab 28 that is perpendicular to both the rule blade 12 and the tab 23. The second tab 28, which is securely affixed at one end to the aperture tab 23, has a blade slot 29 defined in its free end for receiving and supporting a blade from a utility knife or box cutter. The slot 29 in tab 28 permits the sliding of the tape measure apparatus 10 along the starting place 27 of the workpiece 26.

As shown in FIG. 3, the tape measuring apparatus 10 also has a protective shield guide, generally indicated with the number 30. The protective shield guide 30 is made of plastic and is preferably clear or transparent. The protective shield guide 30 includes two components, a protective shield 32 and a guide 33. The protective shield 32 and the guide 33 are pivotally attached by a hinge element 34. The hinge element 34 permits the protective shield 32 to pivot at least 90°, and may permit pivoting up to 180°, as indicated by arrow 35, so that the shield 32 may be alternately be disposed perpendicular to blade 12, parallel to blade 12 and extending towards housing aperture 17, or parallel to blade 12 and extending towards end-piece 20.

In the perpendicular position, the protective shield 32 protects at least a finger or more from slivers, splinters, and other damage caused to the hand when in use. Additionally, the guide 33 moves slidably along the rule blade 12 as indicated by the number 36. The guide 33 includes an index or indication line 38. The indication line 38 aligns with the graduated indicia markings 18 on the rule blade 12. In the parallel position, the protective shield 32 and the guide 33 can slide into the housing 14 through the rule blade aperture 17 at the front wall portion 16. Thus, the protective shield guide 30 with the protective shield 32 and the guide 33 can disappear and be protected from any outside force by being inside the housing 14 when not in use.

It is to be understood that the present invention is not limited to the embodiment described above, but encompasses any and all embodiments within the scope of the following claims.

I claim:

1. A tape measure apparatus, comprising:
   a tape measure housing having a front wall portion defining a rule blade aperture;
   a rule blade retractably stored in the tape measure housing through the rule blade aperture and extending from the rule blade aperture when in use, the rule blade having graduated indicia markings along the rule blade;
   an end-piece attached to the rule blade, the end-piece having a first tab parallel to the rule blade, the first tab having an aperture defined through the tab at an end of the rule blade, the aperture being adapted for receiving a marking instrument to mark and scribe a workpiece, the end-piece having a second tab extending perpendicular to both the rule blade and the first tab, the second tab being securely affixed at one end to the first tab and having a blade slot defined therein adapted for receiving and supporting a blade; and
   a protective shield guide having a protective shield plate, a guide, and a hinge pivotally attaching the shield plate to the guide, the guide being slidable on the rule blade and the shield plate pivoting between a position parallel to the blade when not in use, and a position perpendicular to the guide for shielding a user's fingers when in use.

2. The tape measure apparatus according to claim 1, wherein the guide further comprises an index, the index being alignable with the graduate indicia markings on the rule blade for measuring length.

3. The tape measure apparatus according to claim 1, wherein the protective shield and the guide slidably move in tandem into the housing through the rule blade aperture at the front wall portion with the protective shield and the guide disappearing and being protected from any outside force by being inside the housing when not in use.

4. The tape measure apparatus according to claim 1, wherein said guide is transparent.

5. A tape measure, comprising:
   a housing;
   an elongated measuring tape extendable from and retractable into the housing, the tape having calibrated markings thereon for measuring length, the tape having a free end;
   a tab attached to the free end of the tape, the tab preventing retraction of the free end into the housing, the tab having a first portion parallel to the tape and a second portion perpendicular to the first portion, the second portion having a free end, wherein the second portion of said tab has a slit defined therein, the slit being dimensioned and configured for inserting a blade of the cutting instrument therein, said means for cutting the workpiece comprising a guide slidable on said tape, the guide having an index thereon alienable with the calibrated markings on said tape, whereby the workpiece can be cut at a calibrated length;
   means cooperating with a marking instrument for marking a workpiece;
   means cooperating with a cutting instrument for cutting a workpiece; and
   means for protecting a user's fingers, said means for protecting the fingers comprises a shield plate pivotally attached to said guide, wherein said shield plate is pivotal through an arc of about 180° between a first position parallel to said tape and extending towards said housing, a second position perpendicular to said tape, and a third position parallel to said tape and extending away said housing.

6. The tape measure according to claim 5, wherein the first portion of said tab has an aperture defined therein at the free end of the tape, the aperture being dimensioned and configured for extending a tip of the marking instrument therethrough for marking the workpiece, said means for marking the workpiece comprising a guide slidable on said tape, the guide having an index thereon alignable with the calibrated markings on said tape, whereby the workpiece can be marked at a calibrated length.

7. The tape measure according to claim 6, wherein said guide is made from transparent plastic material.

8. The tape measure according to claim 5, wherein said guide is made from transparent plastic material.

9. The tape measure according to claim 5, wherein said shield plate is pivotal through an arc of about 90° between a first position parallel to said tape and a second position perpendicular to said tape.

10. The tape measure according to claim 9, wherein said guide and said shield plate are retractable within said housing when said shield plate is in the first position.

11. The tape measure according to claim 5, wherein said guide and said shield plate are retractable within said housing when said shield plate is in the first position and when said shield plate is in the third position.

* * * * *